US012308942B2

(12) United States Patent
Regunathan et al.

(10) Patent No.: US 12,308,942 B2
(45) Date of Patent: May 20, 2025

(54) DYNAMIC SPECTRUM AND CAPACITY REORGANIZATION IN SATELLITE SYSTEMS

(71) Applicant: HUGHES NETWORK SYSTEMS, LLC, Germantown, MD (US)

(72) Inventors: Murali Regunathan, Germantown, MD (US); Rajeev Oza, Germantown, MD (US); Satyajit Roy, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 389 days.

(21) Appl. No.: 17/726,294

(22) Filed: Apr. 21, 2022

(65) Prior Publication Data
US 2023/0071786 A1 Mar. 9, 2023

Related U.S. Application Data

(60) Provisional application No. 63/241,538, filed on Sep. 8, 2021.

(51) Int. Cl.
*H04B 7/185* (2006.01)

(52) U.S. Cl.
CPC ..... *H04B 7/18571* (2013.01); *H04B 7/18528* (2013.01); *H04B 7/18541* (2013.01); *H04B 7/18558* (2013.01)

(58) Field of Classification Search
CPC ............. H04B 7/185; H04B 1/71857; H04B 7/18528; H04B 7/18541; H04B 7/18558
See application file for complete search history.

(56) References Cited

U.S. PATENT DOCUMENTS

| | | | | |
|---|---|---|---|---|
| 7,099,797 | B1 * | 8/2006 | Richard | G06F 11/3414 702/182 |
| 7,599,686 | B2 * | 10/2009 | Quinn | H04W 16/10 455/448 |
| 8,139,496 | B2 * | 3/2012 | Stanforth | H04W 72/23 370/252 |
| 8,818,283 | B2 * | 8/2014 | McHenry | H04W 16/14 455/62 |
| 9,826,537 | B2 * | 11/2017 | Forenza | H04L 25/03891 |
| 10,069,560 | B2 * | 9/2018 | Ha | H04B 7/18539 |

(Continued)

FOREIGN PATENT DOCUMENTS

EP 3675584 A1 * 7/2020 ......... H04B 7/18539

*Primary Examiner* — Hai V Nguyen
(74) *Attorney, Agent, or Firm* — Potomac Technology Law, LLC

(57) ABSTRACT

An apparatus method and system are disclosed for dynamically implementing spectrum configuration plans in a satellite communication system. A spectrum configuration plan is created, and validated to determine if it can be utilized within the predetermined coverage area. If any errors are generated while validating the spectrum configuration plan, it is rejected. Otherwise, system components are configured to provide communication within the predetermined coverage area using parameters specified in the spectrum configuration plan. The spectrum configuration plan is also transmitted to all terminals in the coverage area. The spectrum configuration plan is subsequently implemented for all communication within the predetermined coverage area.

21 Claims, 15 Drawing Sheets

(56) References Cited

U.S. PATENT DOCUMENTS

| | | | | |
|---|---|---|---|---|
| 10,356,392 B2* | 7/2019 | Riza | | H04N 23/959 |
| 10,595,222 B2* | 3/2020 | Ravindran | | H04W 28/06 |
| 10,798,019 B2* | 10/2020 | Spapis | | H04L 47/808 |
| 10,917,164 B2* | 2/2021 | Smyth | | H04B 7/18517 |
| 11,476,923 B1* | 10/2022 | Smyth | | H04B 7/18513 |
| 11,569,931 B2* | 1/2023 | Sevindik | | H04L 1/0016 |
| 11,888,577 B1* | 1/2024 | Smyth | | H04B 7/18519 |
| 11,956,789 B2* | 4/2024 | Alfarhan | | H04W 72/0453 |
| 12,166,596 B2* | 12/2024 | Raleigh | | H04M 15/8016 |
| 2006/0252418 A1* | 11/2006 | Quinn | | H04W 16/10 |
| | | | | 455/423 |
| 2006/0271552 A1* | 11/2006 | McChesney | | G06Q 30/02 |
| 2008/0221951 A1* | 9/2008 | Stanforth | | H04W 72/23 |
| | | | | 705/7.41 |
| 2009/0161617 A1* | 6/2009 | Abedi | | H04W 16/10 |
| | | | | 370/329 |
| 2010/0075704 A1* | 3/2010 | McHenry | | H04W 16/14 |
| | | | | 455/67.11 |
| 2010/0235435 A1* | 9/2010 | Inoue | | H04L 51/42 |
| | | | | 709/206 |
| 2010/0281478 A1* | 11/2010 | Sauls | | G06F 9/5077 |
| | | | | 718/1 |
| 2011/0003606 A1* | 1/2011 | Forenza | | H04L 25/03343 |
| | | | | 455/501 |
| 2016/0127808 A1* | 5/2016 | Wong | | H04M 15/08 |
| | | | | 379/112.04 |
| 2016/0329956 A1* | 11/2016 | Ha | | H04B 7/18539 |
| 2017/0180567 A1* | 6/2017 | Sharma | | H04M 15/00 |
| 2019/0116130 A1* | 4/2019 | Spapis | | H04L 47/808 |
| 2019/0281490 A1* | 9/2019 | Ravindran | | H04W 4/06 |
| 2019/0312979 A1* | 10/2019 | Sharma | | H04L 45/22 |
| 2020/0305186 A1* | 9/2020 | Alfarhan | | H04W 72/0453 |
| 2022/0140939 A1* | 5/2022 | Sevindik | | H04L 1/0026 |
| | | | | 455/454 |
| 2022/0399981 A1* | 12/2022 | Pantelias | | H04L 12/2801 |

* cited by examiner

| Spectrum Chunk/ Band | RFGW | SNC or Data Center | User beam (spatial beam) | Uplink freq Start (GHz) | Uplink freq Stop (GHz) | Downlink freq Start (GHz) | Downlink freq Stop (GHz) | FWD or RTN | Uplink Polarization | Downlink Polarization |
|---|---|---|---|---|---|---|---|---|---|---|
| A | 1 | 1 | 1 | 28 | 28.5 | 19.2 | 19.7 | F | L | L |
| B | 1 | 1 | 1 | 28.6 | 28.8 | 19.7 | 19.9 | F | R | L |
| C | 1 | 1 | 1 | 29.5 | 29.8 | 19.2 | 19.5 | R | R | R |
| D | 2 | 1 | 2 | 28.2 | 28.3 | 19.3 | 19.4 | F | L | R |
| E | 2 | 1 | 2 | 29.1 | 29.2 | 20.1 | 20.2 | R | L | L |
| F | 3 | 1 | 3 | 28.5 | 29 | 19.5 | 20 | F | L | R |
| G | 3 | 1 | 3 | 29.2 | 29.5 | 19.2 | 19.5 | R | L | L |

| Modification Description | Band | RFGW | SNC or Data Center | User beam (spatial beam) | Uplink freq Start | Uplink freq Stop | Downlink freq Start | Downlink Freq Stop | FWD or RTN | Uplink Polarization | Downlink Polarization |
|---|---|---|---|---|---|---|---|---|---|---|---|
| Moved to RFGW 3 | A | 3 | 1 | 1 | 28 | 28.5 | 19.2 | 19.7 | F | L | L |
| Moved to RFGW 2 | B | 2 | 1 | 1 | 28.6 | 28.8 | 19.7 | 19.9 | F | R | L |
| Split and Moved to RFGW 2 | C1 | 2 | 1 | 1 | 29.5 | 29.6 | 19.2 | 19.3 | R | R | R |
| Split and Moved to RFGW 3 | C2 | 3 | 1 | 1 | 29.6 | 29.8 | 19.3 | 19.5 | R | R | R |
|  | D | 2 | 1 | 2 | 28.2 | 28.3 | 19.3 | 19.4 | F | L | R |
|  | E | 2 | 1 | 2 | 29.1 | 29.2 | 20.1 | 20.2 | R | L | L |
|  | F | 3 | 1 | 3 | 28.5 | 29 | 19.5 | 20 | F | L | R |
|  | G | 3 | 1 | 3 | 29.2 | 29.5 | 19.2 | 19.5 | R | L | L |

| Modification Description | Band | RFGW | SNC or Data Center | User beam (spatial beam) | Uplink freq Start | Uplink freq Stop | Downlink freq Start | Downlink freq Stop | FWD or RTN | Uplink Polarization | Downlink Polarization |
|---|---|---|---|---|---|---|---|---|---|---|---|
| | A | 1 | 1 | 1 | 28 | 28.5 | 19.2 | 19.7 | F | L | L |
| | B | 1 | 1 | 1 | 28.6 | 28.8 | 19.7 | 19.9 | F | R | L |
| | C | 1 | 1 | 1 | 29.5 | 29.6 | 19.2 | 19.3 | R | R | R |
| | D | 2 | 1 | 2 | 28.2 | 28.3 | 19.3 | 19.4 | F | L | R |
| | E | 2 | 1 | 2 | 29.1 | 29.2 | 20.1 | 20.2 | R | L | L |
| Moved to a different SNC | F | 3 | 2 | 3 | 28.5 | 29 | 19.5 | 20 | F | L | R |
| Moved to a different SNC | G | 3 | 2 | 3 | 29.2 | 29.5 | 19.2 | 19.5 | R | L | L |
| Additional RFGW | H | 4 | 2 | 3 | 28.0 | 28.3 | 19.2 | 19.5 | F | L | R |
| Additional RFGW | I | 4 | 2 | 3 | 29.5 | 29.6 | 19.1 | 19.2 | R | L | L |

600

| Modification Description | Band | RFGW | SNC or Data Center | User beam (spatial beam) | Uplink freq Start | Uplink freq Stop | Downlink freq Start | Downlink freq Stop | FWD or RTN | Uplink Polarization | Downlink Polarization |
|---|---|---|---|---|---|---|---|---|---|---|---|
| Split | A | 1 | 1 | 1 | 28 | 28.3 | 19.2 | 19.5 | F | L | L |
| Split and moved from user beam1 to user beam 3 | A1 | 3 | 1 | 3 | 28.3 | 28.5 | 19.3 | 19.5 | F | L | R |
| | B | 1 | 1 | 1 | 28.6 | 28.8 | 19.7 | 19.9 | F | R | L |
| | C | 1 | 1 | 1 | 29.5 | 29.6 | 19.2 | 19.3 | R | R | R |
| | D | 2 | 1 | 2 | 28.2 | 28.3 | 19.3 | 19.4 | F | L | R |
| | E | 2 | 1 | 2 | 29.1 | 29.2 | 20.1 | 20.2 | R | L | L |
| | F | 3 | 1 | 3 | 28.5 | 29 | 19.5 | 20 | F | L | R |
| | G | 3 | 1 | 3 | 29.2 | 29.5 | 19.2 | 19.5 | R | L | L |

DYNAMIC SPECTRUM AND CAPACITY REORGANIZATION IN SATELLITE SYSTEMS

CROSS-REFERENCE TO RELATED APPLICATION

The present application claims priority to U.S. Provisional Patent Application No. 63/241,538 filed Sep. 8, 2021, and entitled "DYNAMIC SPECTRUM AND CAPACITY REORGANIZATION IN SATELLITE SYSTEMS", the entire disclosure of which is incorporated herein by reference.

BACKGROUND INFORMATION

Traditional satellite communication systems are designed to have fixed frequency plans and fixed gateway to user beam mapping. This fixed construct allows for ease of configuration, operation, and management of the network but reduces flexibility of usage, scalability, and efficiency. There is a growing need in the current satellite industry to move towards a more scalable and adaptable network architecture. To this end, satellites are being designed and deployed that provide reconfigurability using digitized channel architecture. The reconfigurability enables dynamic network frequency plans and dynamic user beam to gateway mapping, thereby allowing the network capacity and coverage to evolve and grow as demand and customer populations change over time. Certain satellite architectures can also provide a dynamic reconfiguration of the spatial coverage based on demand.

Traditional satellite communication systems assume a fixed network with little to no reconfigurability in the satellite payload. The gateway to user beam mapping, frequency plans and other system wide parameters are assumed to be static throughout the life of the system. Various network elements must be redesigned to leverage the capabilities of a reconfigurable satellite. This can involve redesigning software and hardware elements of the terminal, gateway, and the network management system. Current systems do not allow the frequency mapping between spot beams and gateways to be changed in either the forward or return path. This static mapping prevents the reorganization of spectrum across gateways and user beams. Furthermore, such systems cannot be dynamically configured to allow the frequency plan to be changed based on demand, availability of resources, and optimized spectrum usage.

BRIEF SUMMARY

An apparatus method and system are disclosed for dynamically implementing spectrum configuration plans in a satellite communication system. According to an embodiment, the method includes: creating a spectrum configuration plan for providing communication within a predetermined coverage area of a satellite network; validating the spectrum configuration plan to determine if it can be utilized within the predetermined coverage area; rejecting the spectrum configuration plan, if the validating results in one or more errors; configuring system components for providing communication within the predetermined coverage area using parameters specified in the spectrum configuration plan; transmitting the spectrum configuration plan to terminals within the predetermined coverage area; and implementing the spectrum configuration plan for all communication within the predetermined coverage area, wherein the spectrum configuration plan is dynamically implemented without interrupting communication within the predetermined coverage area.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 5 is a diagram of a spectrum configuration table that can be used to accommodate gateway redundancy, according to one embodiment;

FIG. 7 is a is a diagram of a spectrum configuration table that can be used to accommodate spectrum reassignment, according to one embodiment;

DETAILED DESCRIPTION

An apparatus and method for dynamically implementing spectrum configuration plans in a satellite communication system are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
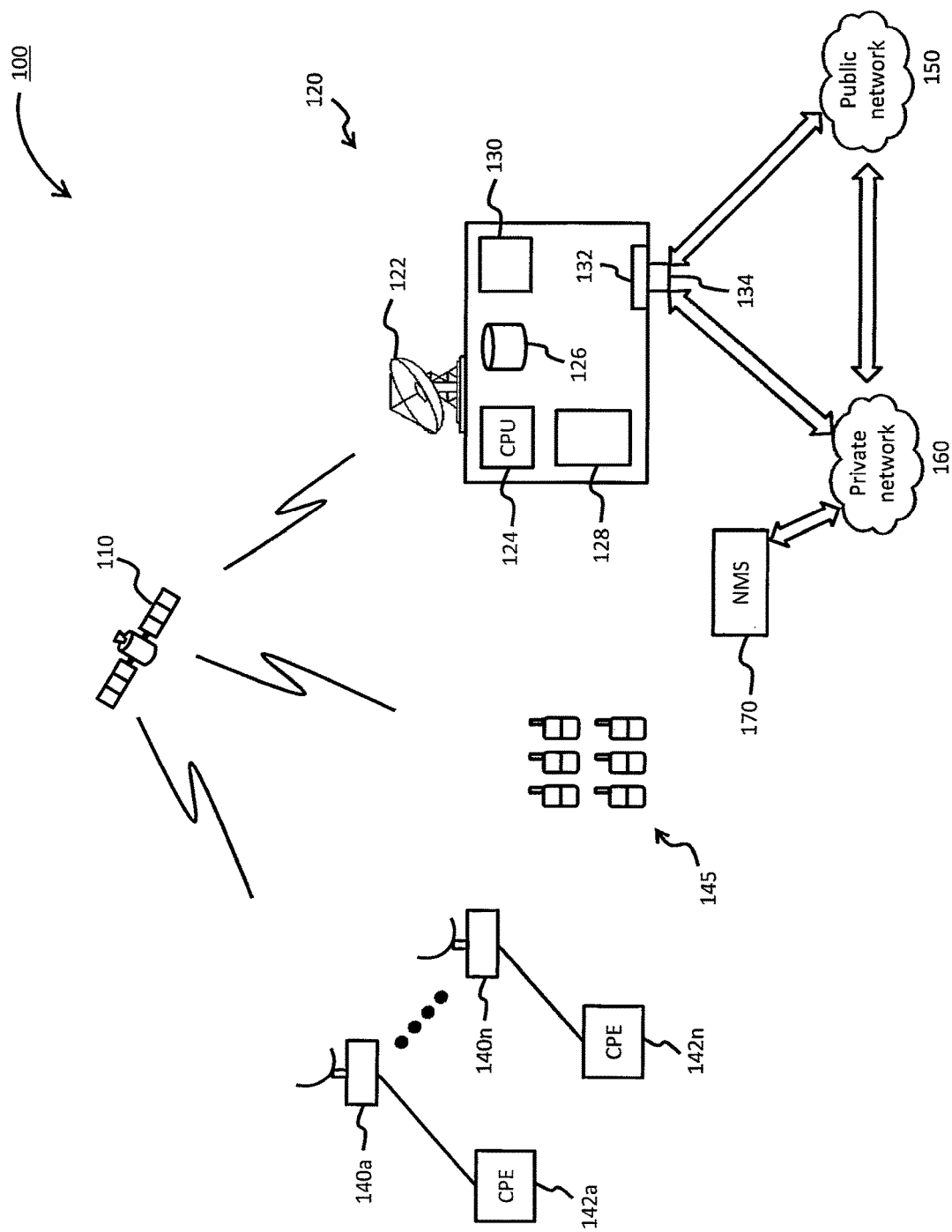
FIG. 1 is a diagram of a system capable of providing voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140a-140n. Each satellite terminal (or terminal) 140 can be configured for relaying traffic between its customer premise equipment (CPEs) 142a-142n (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According to various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is configured, using a combination of software, hardware, circuitry, etc., to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The terms beam, spot beam, and coverage beam are used interchangeably herein. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
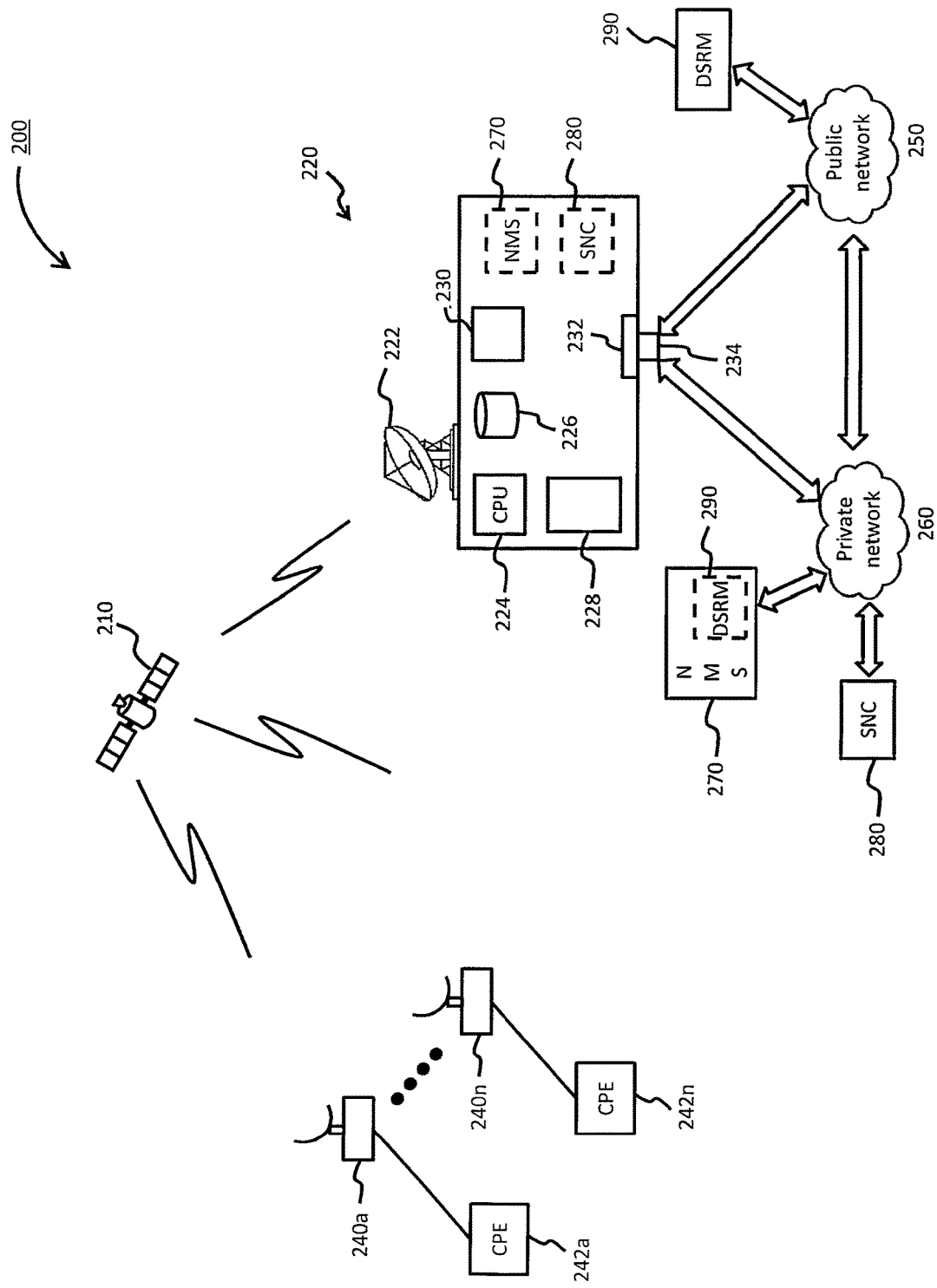
FIG. 2 is a diagram of a system capable of dynamically changing spectrum configuration, according to one embodiment.

FIG. 2 illustrates a satellite communication system 200 capable of dynamically changing spectrum configuration, according to one embodiment. The satellite communication system 200 includes a satellite 210 that supports communications among a number of gateways 220 (only one shown) and multiple stationary satellite terminals 240a-240n. Each satellite terminal (or terminal) 240 can be configured for relaying traffic between its customer premise equipment (CPEs) 242a-242n (i.e., user equipment), a public network 250 such as the internet, and/or its private network 260.

According to an exemplary embodiment, the terminals 240 can be in the form of VSATs, mobile terminals, or transportable terminals, etc. The gateway 220 can be configured to route traffic between the terminals 240 and across the public network 250 and/or private network 260 as appropriate. The gateway 220 can be further configured to route traffic from the public network 250 and private network 260 across the satellite link to the appropriate terminal 240. The terminal 240 then routes the traffic to the appropriate customer premise equipment (CPE) 242. The gateway 220 can include a radio frequency transceiver 222 (RFT), a processing unit 224 (or computer, CPU, etc.), and a data storage unit 226 (or storage unit). The data storage unit 226 can be used, for example, to store and provide access to information pertaining to various operations in the satellite communication system 200. The data storage unit 226 can also be used to store information pertaining to different spectrum configuration plans, as well as a plurality of spectrum configuration plans. Depending on the specific implementation, the data storage unit 226 (or storage unit) can be configured as a single drive, multiple drives, an array of drives configured to operate as a single drive, etc.

The gateway 220 also includes baseband components 228 which operate to process signals being transmitted to, and received from, the satellite 210. A fault management unit 230 can be included in the gateway 220 to monitor activities and output one or more alerts in the event of a malfunction in any of the gateway components. The fault management unit 230 can include, for example, one or more sensors and interfaces that connect to different components of the gateway 220. The fault management unit 230 can also be configured to output alerts based on instructions received from a remotely located network management system 270 (NMS). The gateway 220 can further include a network interface 232, such as one or more edge routers, for establishing connections with a terrestrial connection point 234 from a service provider.

The system 200 also includes a SNC 280 which forms part of the gateway 220. Depending on the specific implementation, the SNC 280 can be externally located (at a data warehouse) or co-located within the physical structure of the gateway 220. According to the illustrated embodiment, the gateway 220 can be segmented into 2 distinct components, namely a radio frequency gateway (RFGW), and a satellite network core (SNC). The RFGW includes the radio frequency transmitter and modems used to transmit and receive signals with the satellite. The SNC includes all the SLC/MAC and Networking components such as IPGWs, Inroute and Outroute transport and manager modules, VNO/NSP (Virtual Network Operator, Network Service Provider) Bandwidth Manager, DPI, backhaul routers, firewall, etc. According to at least one embodiment, the SNC logical entity can be physically located within a data center capable of hosting multiple SNC entities. The SNC can also be located within the same physical structure as the RFGW. In either case, the term "gateway" is used to address the combination of both entities (i.e., RFGW and SNC). According to various embodiments, each individual SNC can serve multiple RFGWs. According to further embodiments, each RFGW can be served by multiple SNCs during a given time. The ability to serve multiple gateways allows for a reduction in the total number of SNCs, while also providing redundancy.

The system also includes a Dynamic Spectrum Resource Manager 290 (DSRM) which manages, in part, bandwidth allocation and reorganization during creation and implementation of spectrum configuration plans (also referred to as system frequency plans). According to the illustrated embodiment, the DSRM 290 can also be co-located with the NMS 270. For example, various embodiments provide customers with an ability to manage leased or assigned frequency spectrum independently of the network operator. Accordingly, the DSRM 290 would be located within the customer premises or at a location under control of the customer. Upon creating a spectrum configuration plan (or system frequency plan), the customer would transmit all necessary information to the NMS 270 by way of the public network 250 or the private network 260. According to other embodiments, the DSRM 290 can be co-located with the NMS 270. This would occur in situations where only the network operator is solely authorized to create, change, and administer different spectrum configuration plans. Furthermore, if the NMS 270 is co-located at the same location as the gateway 220, the DSRM 290 could also be located within the NMS 270 at the gateway 220. Alternatively, the DSRM 290 can be located within the physical structure of the gateway 220, but in communication with the NMS 270 via wired or wireless communication links.

Figure 3:
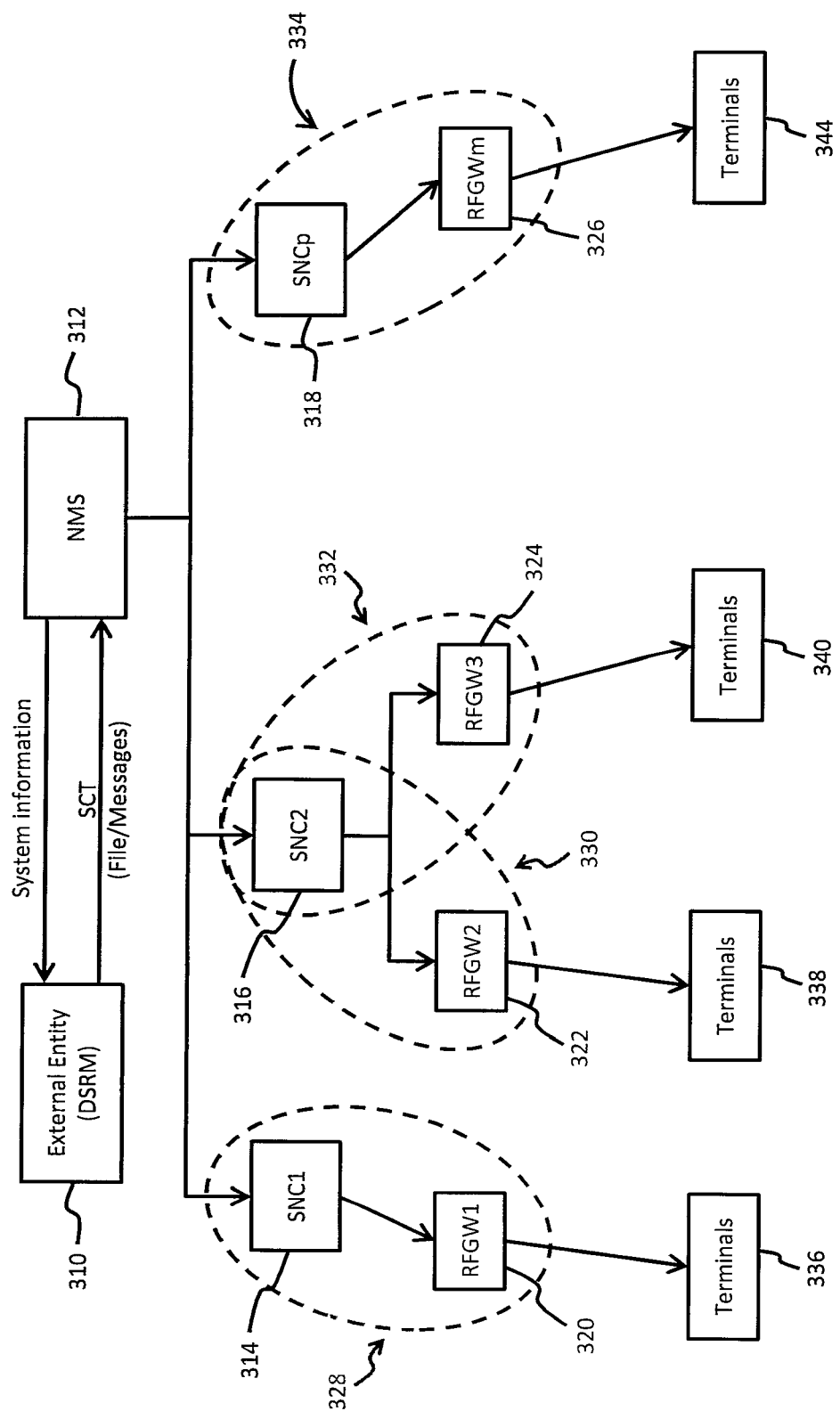
FIG. 3 is a diagram illustrating interactions between various system components during implementation of a spectrum configuration plan, according to one embodiment.

FIG. 3 is a block diagram illustrating interactions between various system components during implementation of a spectrum configuration plan, in accordance with various embodiments. As illustrated in FIG. 3, the DSRM 310 is in the form of an external entity (or client) with the ability to create and implement its own specific spectrum configuration plans. The DSRM 310, therefore provides all information associated with the spectrum configuration plan to the NMS 312. The information for defining the spectrum configuration plan can be transmitted to the NMS 312 in the form various file and/or message formats which allow a spectrum configuration table (SCT) to be created. As discussed in greater detail below, the spectrum configuration table (SCT) provides sufficient information for the NMS 312 to dynamically implement the spectrum configuration plan requested by the DSRM 310.

According to at least one embodiment, the DSRM 310 can also supply a specific time at which the spectrum configuration plan should be activated. According to other embodiments, specific times, or time intervals, can be used for automatically activating a received spectrum configuration plan. For example, agreements may be established wherein the DSRM 310 requires a new spectrum configuration plan to be implemented every 6 hours. As of fallback, if no spectrum configuration plan is received by the NMS 312, the existing spectrum configuration plan remains active for the next 6 hour time interval. A predetermined time buffer (e.g., 30 minutes, 45 minutes, 60 minutes, etc.) can also be established between the time at which a new spectrum configuration plan is received and the time it can be implemented. For example, the DSRM 310 may be required to transmit spectrum configuration plans at least one hour prior to the time of activation.

Consider a system wherein the NMS 312 implements a new spectrum configuration plan for the DSRM 310 at 12 am, 6 am, 12 pm, and 6 pm. If the NMS 312 receives a new spectrum configuration plan between 12 am and 5 am, the new spectrum configuration plan will be implemented at 6 am. If the NMS 312 receives the spectrum configuration plan at 5:30 am, the current plan would remain active between 6 am and 12 pm. As previously discussed, a predetermined amount of time (e.g., 1 hour) may be required to implement a new spectrum configuration plan. Accordingly, the plan received at 5:30 am lacks the requisite amount of time for implementation. According to at least one embodiment, the plan can be optionally implemented at the next plan activation time (i.e., 12 pm). Additionally, if no plan is received prior to 6 am, the existing plan would remain active until 12 pm.

According to the embodiment illustrated in FIG. 3, the NMS 312 can also provide various system information to the DSRM 310 in order to assist in creating and planning new spectrum configuration plans. The system information can include, for example, total system capacity, load within relevant beams, environmental conditions in relevant beams, etc. According to at least one embodiment, the NMS 312 validates any newly received spectrum configuration plans in order to confirm or verify that it can be utilized within the coverage area allocated to the DSRM 310. For example, the DSRM 310 may be allocated specific amount of frequency bandwidth within one or more coverage beams, the entire frequency bandwidth within one or more coverage beams, etc. The NMS 312 would therefore validate the spectrum configuration plan to ensure that it can be implemented within the allocated coverage beams without disrupting communication within the allocated coverage beams or in surrounding coverage beams.

The validation process may involve multiple types of tests. According to at least one embodiment, the tests can be syntactic and/or semantic in nature. The syntactic checks can include type checking and range checking. Type checking compares the type of the SCT element to that included in the message. Range checking checks the range of the SCT element against that in the message. Specific syntactic checks performed by the NMS 312 include, without limitation, the following:

Type Checking:
1. Band name is alphanumeric
2. Outroute ID is a number etc.

Range Checking:
1. The range of user beam, SNC, and RFGW IDs are consistent and does not exceed with prior definitions.
2. The value of band is within definition
3. The start frequency in each band definition is lower in value than the end frequency
4. For each band, the amount of downlink frequency spectrum is the same as that of the uplink frequency
5. On any one gateway, the range of frequencies for each band are unique on the uplink and on the downlink
6. On any one user beam, the range of frequencies for each band are unique on the uplink and on the downlink
7. Every user beam has both return and forward spectrum allocated Semantic checking includes verifying elements of the plan that cannot be executed by the system even though they might be correct syntactically. For example, if two bands are allocated on the same frequency on the uplink with the same RFGW, then one of the bands cannot be used even though grammatically they are both correct. Specific semantic checks performed by the NMS 312 include, without limitation, the following:
1. Verifying the number of RFGWs assigned to a particular SNC is consistent with the throughput and capacity of the SNC.
2. Verifying the polarization for transmit and receive on the coverage beam (or user beam) and the gateway are consistent with the hardware installed. For example, if the terminals in user beam 1 are all LHCP transmit and RHCP receive, then the band assigned to user beam 1 should have downlink polarization as RHCP and uplink polarization as LHCP.
3. Verifying the range of frequencies assigned to any one gateway is consistent with the hardware installed. For example, the gateway frequency assignment should not have any duplicates or be out of transmit bands.
4. Verifying the range of frequencies assigned to any one coverage beam is consistent with the hardware installed According to at least one embodiment, part of the validation performed by the NMS can include identification of differences between any newly received spectrum configuration plan and the currently active one. The NMS would only apply configuration changes which correspond to differences between the new plan and the existing plan in order to implement the new plan. Thus, rather than reconfiguring all components, only components that require reconfiguration based on the new plan would be affected. Depending on the differences between the plans, the amount of time required to reconfigure system components for implementing a new plan can be reduced.

Once the spectrum configuration plan has been validated, the NMS 312 provides the configuration information to the required gateways. Depending on the specific implementation, the NMS 312 can provide the spectrum configuration plan to all gateways in the satellite network. Only gateways specifically affected by spectrum configuration plan, however, would implement the configuration changes. For example, if the spectrum configuration change affects ten beams in the system, only the gateway (or gateways) responsible for servicing those beams would implement the configuration changes.

According to the embodiment illustrated in FIG. 3, the system includes multiple SNCs, namely SNC1 314, SNC2 316, up to SNCp 318. The system also includes multiple RFGWs, namely RFGW1 320, RFGW2 322, RFGW3 324, and RFGWm 326. SNC1 314 is associated with RFGW1 320, thereby defining a first gateway 328. As previously discussed, each SNC can be associated with multiple RFGWs. This is the case with SNC2 316, which is associated with RFGW2 322 as well as RFGW3 324. A second gateway 330 is therefore defined by the second SNC 316 and the second RFGW 322. A third gateway 332 is defined by the second SNC 316 and the third RFGW 324. The final gateway 334 is defined by SNCp 318 and RFGWm 326. The gateways 328, 330, 332, 334 utilize the configuration information received from the NMS 312 to make the necessary hardware and/or software changes required to implement the new spectrum configuration plan. The gateways 328, 330, 332, 334 also receive the time, or information pertaining to the time, at which the new spectrum configuration plan should be implemented. The gateways 328, 330, 332, 334 subsequently supply the necessary configuration information to all terminals which they support.

For example, gateway 328 would supply the required configuration information to terminals 336. Gateway 330 would supply the necessary configuration information to the terminals 338. Gateway 332 would supply the information to terminals 340, while gateway 334 would supply the information the terminals 344. According to at least one embodiment, the configuration information can be supplied to the terminals within a downlink profile which contains outroute information for each terminal. For example, gateway 328 would include the configuration information for the new plan within the downlink profile with the outroute information for terminals 336. Depending on the specific spectrum configuration plan being implemented, certain terminals may not be affected by the changes. According to at least one embodiment, changes can be implemented transparently to such terminals without the need to supply the new configuration plan. For example, if the spectrum and outroute carriers being used by terminals as part of the current plan remains the same as those specified in the new configuration plan, the new spectrum configuration plan can be implemented transparently with respect to these terminals. All configuration changes would be made at the gateway and communication with the terminals would continue transparently from the standpoint of the terminals.

The terminals typically require information about the forward carriers in the user beam to allow them to tune the receiver to the specified frequency and symbol rate. The terminals receive information about the system from the outroute to which the receiver is tuned. For example, each user beam can have one carrier that is fixed, and the carrier's parameters are programmed into the terminal before installation. This carrier is known as anchor outroute. The terminal can also contain a configuration file which stores, in part, an outroute frequency plan. According to various embodiments, anchor outroutes can be defined or indicated as such in the SCT/frequency plan tables. Typically, there will be a minimum number of anchor carriers present per beam, but mostly only one per downlink forward polarization. Certain configurations, however, can have multiple anchor outroutes per user beam. Anchor outroutes can be shared in a beam across resource pools, even if the resource pools are from different RFGWs and in some cases there can be one anchor outroute per beam. A resource pool corresponds to a set of forward and return carriers from a beam which is served by one RFGW. If a beam is served by more than one RFGW, the anchor outroute can be on any of those RFGWs. The anchor outroute may be conveyed in all Downlink Profiles for a beam for a given downlink forward polarization. The anchor outroute can also be broadcast as system information. In addition, the downlink profile can include outroutes from other resource pools for other RFGWs serving that beam with same user beam downlink forward polarization.

Satellite communication systems are typically designed to have fixed frequency plans and fixed gateway to user beam mapping. While such a fixed design allows for ease of configuration, operation, and management of the network, the design can also reduce flexibility, scalability, and efficiency. According to the disclosed embodiments, spectrum configuration plans can be used for changing the frequency on the uplink or downlink associated for transmission on either the forward or return path. The frequency can be simultaneously changed for a single carrier or multiple carriers. The spectrum configuration plans of multiple gateways and beams can also be changed simultaneously. Additionally, the spectrum configuration plan can also be used to change the gateway to user beam mapping.

The spectrum configuration plan can be used to describe the spectrum distribution across all elements in the satellite network. It describes the forward and return path spectrum distribution on the GWs and on each beam, and can be associated with one or more satellites. According to an embodiment, the entire frequency spectrum available to the system can be split into contiguous chunks called contiguous chunks of bandwidth (CCB). The terms CCB, sub-band, and band are used interchangeably herein. Each CCB can also have a polarization element, and the same spectrum chunk with different polarizations constitutes two separate bands/CCBs.

Figure 4:
FIG. 4 is a diagram of a spectrum configuration table that can be used to implement a new spectrum configuration plan, according to one embodiment.

FIG. 4 illustrates a spectrum configuration table (SCT) 400 that can be used by the NMS 312 to implement a new spectrum configuration plan, according to one or more embodiments. As previously discussed, the DSRM 310 can be part of the NMS 312, or part of an external entity (e.g., customer) that leases (or purchases) bandwidth within the satellite network. If the DSRM 310 is located within the NMS 312, the SCT 400 would be readily available or accessible. For example, the SCT 400 can be stored in a shared (network) storage unit such as storage unit 226. Thus, the NMS 312 can access the information either directly as part of co-location and integration with the gateway, or remotely via one or more public and/or private networks. If the DSRM 310 is under the control of an external entity, however, the SCT 400 would be supplied to the NMS 312 over the public and/or private networks.

According to the embodiment illustrated in FIG. 4, seven different CCBs are defined. Beam 1 receives two forward CCBs and one return CCB, while beam 2 and beam 3 have one CCB on the return and forward each. The polarization, left-hand circular or right-hand circular (L or R), on the user beams are chosen such that the transmit and receive are on opposite polarization, although it is not necessary. Each CCB in the SCT 400 is associated with a user beam, a RFGW, a SNC, a downlink and uplink center frequency, bandwidth of the chunk, and a polarization for each downlink and uplink. Each CCB can be designated as forward or return and has a set of properties that can be further used to configure the carriers in the CCB. In the forward path, the downlink frequency is for the user beam receive and the uplink frequency for the gateway transmit. In the return path, the downlink frequency is for the gateway receive and the uplink frequency for the user beam transmit. The uplink and downlink frequency in each path can have a linear relationship determined by the frequency conversion that occurs in the satellite. All the carriers in a CCB will experience the same conversion. Each CCB in the SCT 400 is denoted by alpha-numeric designation, and represent a complete path (GW-Sat-Term or Term-Sat-GW). According to at least one embodiment, the SCT can be normalized to help reuse the bands and reduce the database size.

While FIG. 4 illustrates specific entries associated with the SCT 400, it should be noted that additional fields can be included in order to provide a complete set of parameters that are necessary to implement the spectrum configuration plan. The fields illustrated with respect to the SCT 400 should therefore be considered illustrative, and not restrictive. For example, the SCT 400 can include fields corresponding to forward path parameters such as VLSNR, Annex E mode, waveform type, etc. The SCT 400 can also include return path fields such as spreading factor, saturated or Linear, etc. According to various embodiments, each CCB can have one or more carriers. Thus, the DSRM can also specify the number of carriers for use with each CCB in the SCT 400.

FIG. 5 illustrates a spectrum configuration table (SCT) 500 that can be used for spectrum modification to accommodate gateway redundancy, according to an embodiment. According to the illustrated embodiment, the system is currently implementing a spectrum configuration plan defined by SCT 400. Thus, SCT 500 contains changes relative to SCT 400. SCT 500 can be implemented, for example, in a situation where a failure occurs at RFGW1, and its entire spectrum must be moved (or reassigned) to RFGW2 and RFGW3. Since the uplink frequencies at the RFGW might be already occupied, either the existing chunks or CCBs have to be split or moved around. In the instant case, the forward CCBs are not split but moved as is. Specifically, Band A is moved to RFGW 3 and Band B is moved to RFGW2. The return CCB (Band C), however, must now be split so that one portion can be moved to RFGW3 and the other to RFGW2. This is to allow the terminals on user beam 1 that are using band A or B to be able to have the return path to the same RFGW as the forward path is.

Figure 6:
FIG. 6 is a diagram of a spectrum configuration table that can be used to accommodate gateway growth, according to one embodiment.

FIG. 6 illustrates a spectrum configuration table (SCT) 600 that can be used for spectrum modification to accommodate gateway and SNC growth, according to at least one embodiment. According to the illustrated embodiment, the system is currently implementing a spectrum configuration plan defined by SCT 400. Thus, SCT 600 contains changes relative to SCT 400. SCT 600 can be implemented in response to addition of another RFGW/SNC for extra bandwidth and capacity for the system. The spectrum configuration table 600 is modified to add the extra bands that the new RFGW is going to support. In order to allow better load balancing between SNCs, the traffic being served from RFGW 3 is moved to SNC 2. No modifications are made to the existing frequency band configuration.

FIG. 7 illustrates a spectrum configuration table (SCT) 700 that can be used for spectrum modification to accommodate spectrum reassignment, according to an embodiment. According to the illustrated embodiment, the system is currently implementing a spectrum configuration plan defined by SCT 400. Thus, SCT 700 contains changes relative to SCT 400. SCT 600 can be implemented in response to spectrum from a first user beam being moved to another user beam, thereby re-distributing the system bandwidth allowing efficient capacity management. According to the exemplary embodiment shown in FIG. 7, spectrum is moved from Beam 1, band A to beam 3. Since beam 3 is served by RFGW 3 the spectrum must also be served by RFGW 3. In this case, only the forward spectrum is moved, and the return path is maintained. In most cases, both will be changed. It is also possible that the spectrum is moved between user beams being served by the same RFGW.

According to various embodiments, the SCT can be implemented as multiple data tables to reduce data redundancy and keep the database efficient. The CCBs have a 1:1 relationship with the set {center frequency, bandwidth, polarization, and properties}. This set for both forward and return can be normalized and the other portions of the SCT kept the same. According to such embodiments, the CCB definitions can be reused across user beams and RFGWs. The CCBs can be further normalized into uplink and downlink CCBs, and the mapping between the two needs to be present in the user beam.

Figure 8:
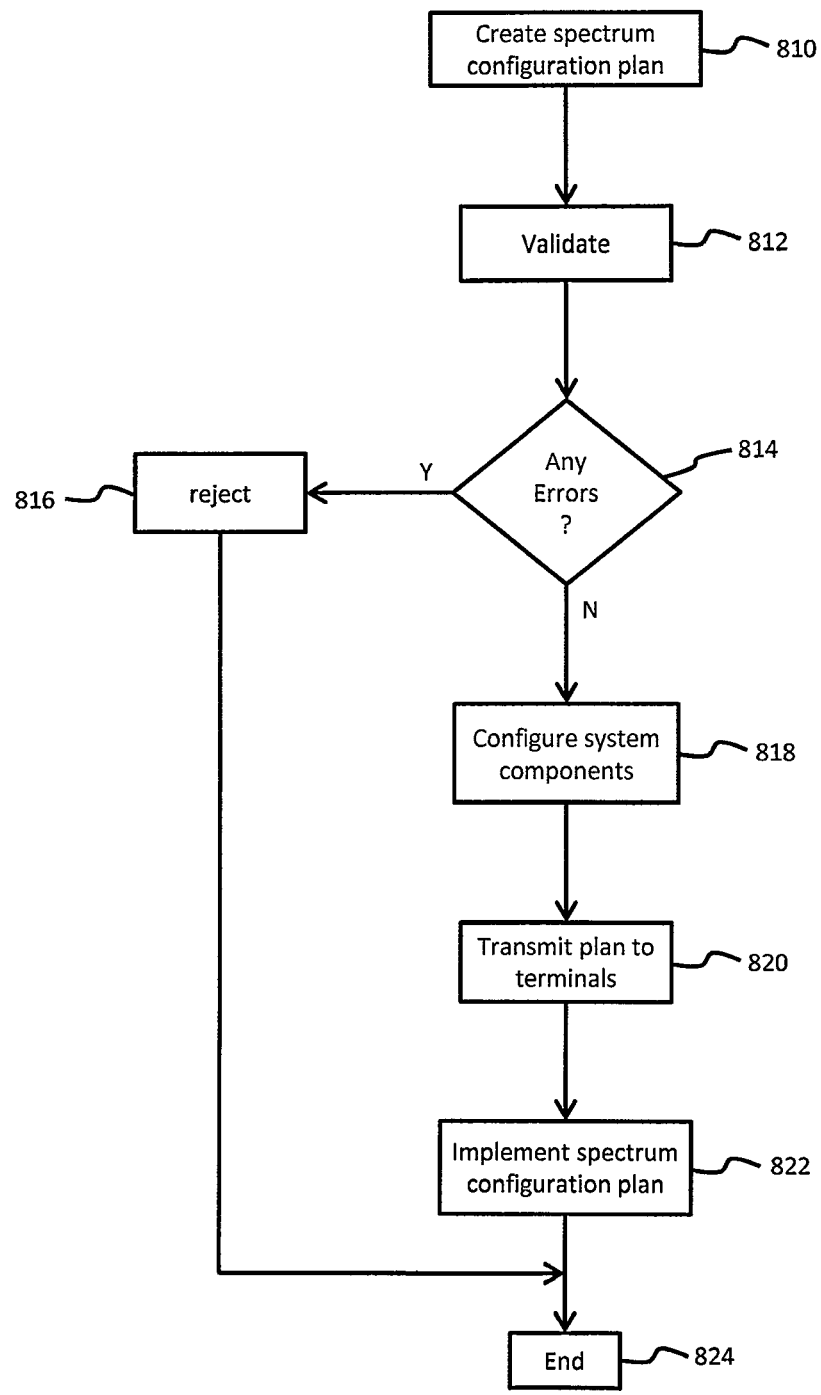
FIG. 8 is a flowchart of a process for dynamically implementing a spectrum configuration plan, according to one embodiment.

FIG. 8 is a flowchart illustrating a process for dynamically implementing a spectrum configuration plan, according to at least one embodiment. At 810, the spectrum configuration plan is created. As previously discussed, this can involve identification of information such as specific spectrum chunks, gateways, user beams, uplink frequencies, downlink frequencies, etc. At 812, the plan is validated. According to at least one embodiment, the spectrum configuration plan is validated in order to ensure that it can be implemented without adversely interfering with other frequencies within a beam and/or other beams. This can involve various tests and analyses using system information available to the NMS. At 814 it is determined whether any errors have occurred as part of the validation process. If any errors are detected, then the plan is rejected at 816. According to at least one embodiment, the NMS can provide information to the DSRM indicative of the specific aspects of the spectrum configuration plan that resulted in the error. The NMS can further indicate that the plan would not be implemented as a result of these errors. The process would subsequently end at 824.

If no errors are detected, various system components are configured at 818. According to at least one embodiment, the NMS can supply the spectrum configuration plan to the relevant gateways, or and gateways within the satellite network. Alternatively, the NMS can supply only the information necessary to configure specific components associated with the affected gateways. At 820, the spectrum configuration plan is transmitted to all relevant terminals. According to at least one embodiment, the gateway can include the required spectrum configuration information within a downlink profile which contains our route information for each of the terminals serviced by the gateway. At 822, the newly created spectrum configuration plan is implemented (or becomes active). Thus, the new configurations would supersede the configuration currently being used. The process ends at 824.

Figure 9A:
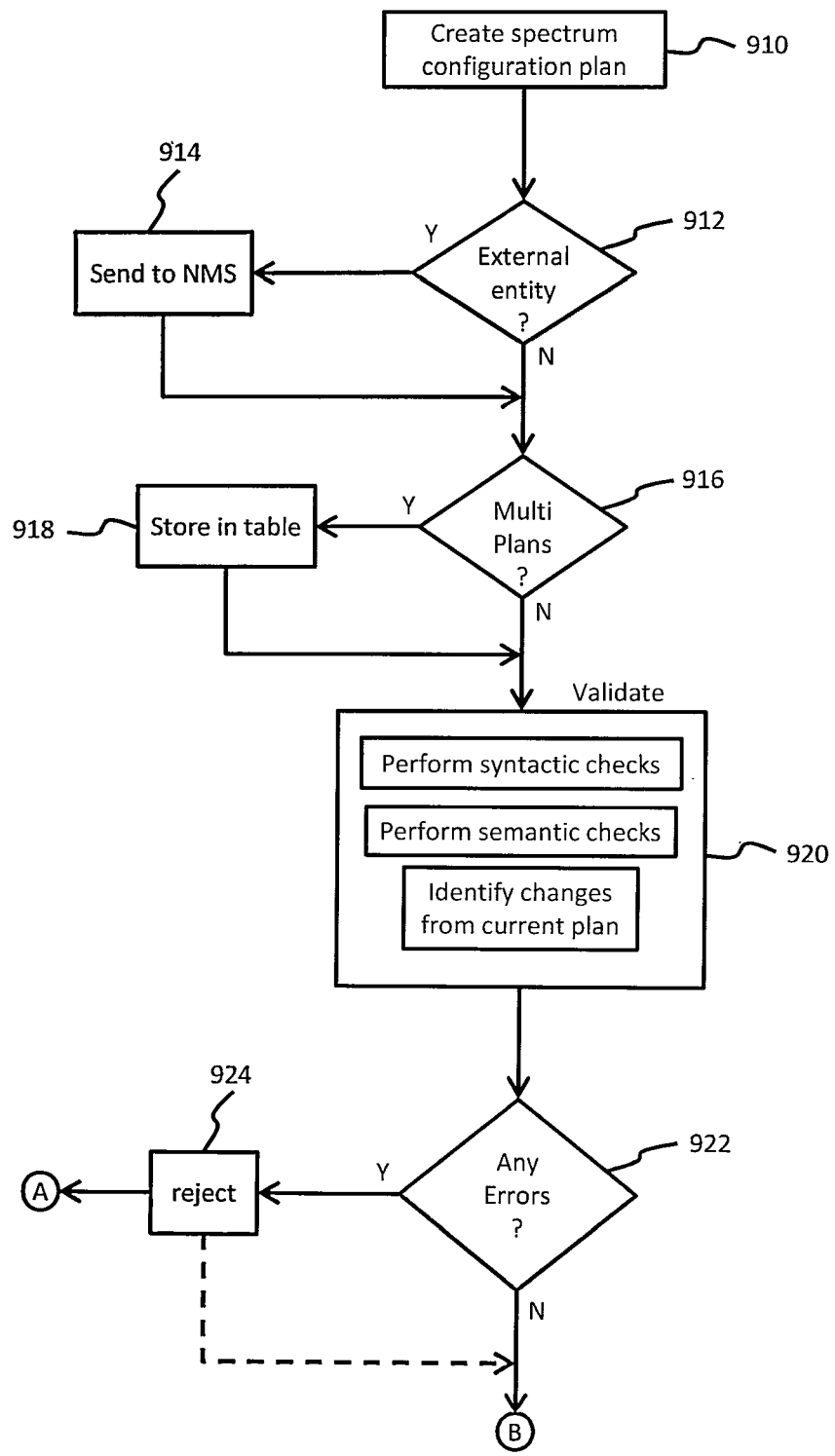
FIGS. 9A and 9B are a flowchart of a process for dynamically implementing a spectrum configuration plan, according to one embodiment.
Figure 9B:
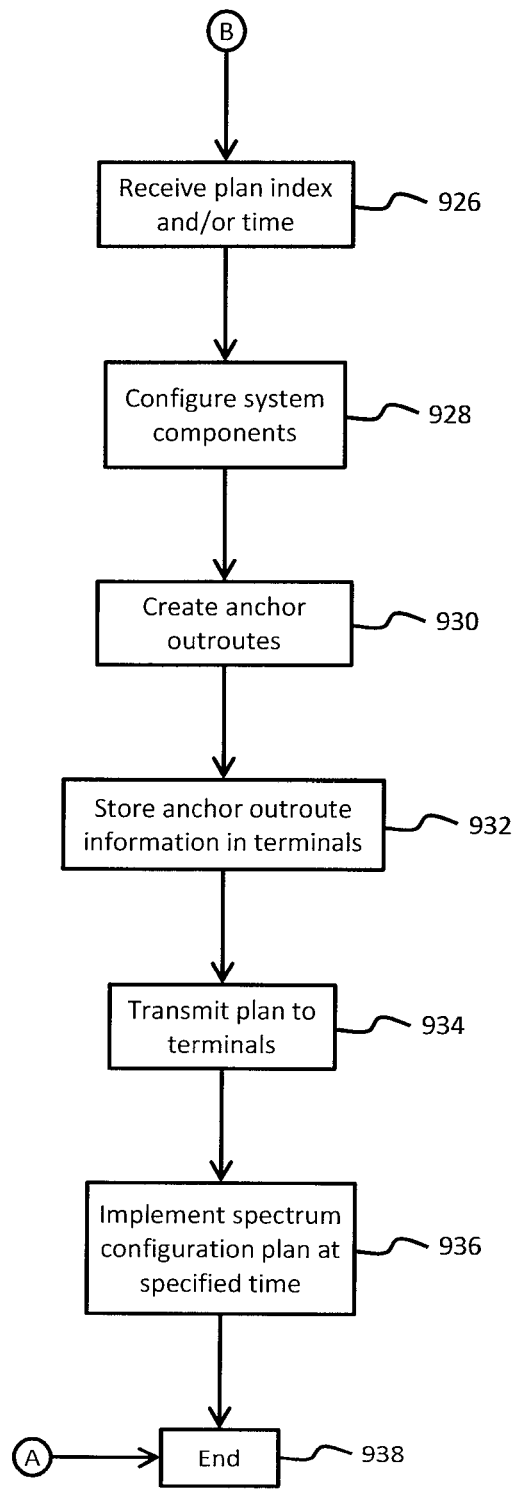

FIG. 9 is a flowchart illustrating a process for dynamically implementing a spectrum configuration plan in accordance with various embodiments. At 910, the spectrum configuration plan is created. This can be done, for example, by a DSRM configured to analyze its allocated bandwidth as well as system information in order to create a plan that satisfies predetermined requirements. At 912, it is determined whether the spectrum configuration plan was created by an external entity. For example, a customer who leases bandwidth in the satellite network would be considered an external entity. Alternatively, an administrator of the satellite network would not be considered an external entity. If the plan was created by an external entity, then the plan is transmitted to the NMS at 914. Control would then pass to 916. Similarly, if the spectrum configuration plan was not created by and external entity, control would also pass to 916.

Although FIG. 9 illustrates a specific test to determine whether or not the spectrum configuration plan was created by an external entity, it should be noted that an actual test need not be performed. Such a determination would be implicit based on the location of the DSRM. Thus, if the DSRM is remotely located, or controlled by an external entity, the spectrum configuration plan would necessarily be transmitted to the NMS so that it may be implemented. If the DSRM is located within the gateway, NMS, or data warehouse under control of the network operator, the plan can be easily accessed by the NMS when the spectrum configuration plan must be implemented.

At 916, it is determined if the spectrum configuration plan contains multiple individual plans. According to various embodiments, the spectrum configuration plan can be designed as a single plan or multi-plan. The DSRM can therefore create and supply an individual plan that is to be implemented, together with an activation time. The DSRM can also create and supply a multi-plan spectrum configuration plan which contains a plurality of plans that can be implemented either at specified times, specific time intervals, etc. If the spectrum configuration plan contains multiple individual plans, then they are stored in a table, such as a spectrum plan table, at 918. Multiple individual plans can also be saved in a database (e.g., spectrum configuration database) using appropriate data structures, depending on the specific implementation. According to at least one embodiment, the table can be configured such that each entry contains all of the necessary information associated with an individual plan. For example, the first row of the table can correspond to the first plan, while each column contains the required configuration parameters associated with the first plan. The table can also be configured as a multi-page table, wherein each page contains an SCT (such as SCT 400). Additionally, the spectrum configuration plan can be stored in a database containing plan numbers and associated plan specifications. Control then passes to 920 after the spectrum configuration table has been stored. Control also passes to 920 if the newly created spectrum configuration plan does not contain multiple individual plans.

At 920, a validation is performed in order to determine whether the spectrum configuration plan can be implemented. If the spectrum configuration plan contains a single plan then the validation is only performed for that plan. If the spectrum configuration plan contains multiple individual plans, then each individual plan must be independently validated. According to the illustrated embodiment, the validation performed at 920 can include syntactic checks, semantic checks, and/or identification of changes between the current plan and the new plan. At 922, it is determined whether any errors have occurred as a result of the validation process. If any errors have occurred, then the plan is rejected at 924. According to at least one embodiment, if multiple individual plans are included, the NMS can reject individual plans from the group. Alternatively, the entire spectrum configuration plan (all individual plans) can be rejected. Furthermore, the entire spectrum configuration plan may be rejected as soon as an individual plan fails the validation process. The process would subsequently ends at 938.

According to at least one embodiment, control can optionally pass to 926 if any errors have occurred. For example, if multiple individual plans are provided, only the plans that result in validation errors would be rejected, while the plans that do not result in validation errors would be maintained. Consider a spectrum configuration plan that contains 10 individual plans. If 3 of the individual plans cause validation errors, such plans can be discarded from the table and the remaining 7 plans would form the active table. The NMS could subsequently inform the DSRM of which plans have been rejected and the current structure of the table. The DSRM could optionally submit an entirely new spectrum configuration plan, or accept the current plan with the rejected 3 entries. If the validation does not result in any errors, then a plan index or time is received at 926.

According to at least one embodiment, if there is only one individual plan, it can be received together with a time for implementation (or activation). The DSRM can also supply the time for implementation separate from the spectrum configuration plan. If multiple plans are included, the spectrum configuration plan can include entries corresponding to a time at which each individual plan should be activated. Alternatively, the DSRM can periodically provide the NMS with an index which corresponds to a specific plan within the table as well as a time at which that plan should be implemented. Thus, different plans can be dynamically implemented based on the current system load or cyclical system loads. For example, entries in the table can correspond to rush hour periods, non-rush-hour periods, accident occurrences, scheduled events (concerts, sports, etc.), emergencies, etc. Depending on the specific DSRM, such factors can applied to the entire satellite network or only to the portion of the spectrum allocated to the customer.

At 928, system components are configured to implement the new spectrum configuration plan. As previously discussed, this can correspond, in part, to the gateways receiving some or all of the information pertaining to the spectrum configuration plan, and configuring hardware and software for communicating in accordance with the specifications defined in the spectrum configuration plan. According to at least one embodiment, anchor outroutes can be created within the system for each coverage beam. This can be done, for example, during an initialization process. Alternatively, this can be done as part of implementing a new spectrum configuration plan. In such cases, anchor outroutes would only be created within the specific beams affected by the new spectrum configuration plan. If anchor out routes are created, regardless of the manner, information pertaining thereto is stored in all of the relevant terminals. This is indicated at 932. At 934, the spectrum configuration plan is transmitted to the terminals. At 936, the spectrum configuration plan is implemented at the specified time. The process subsequently ends at 938.

Figure 10:
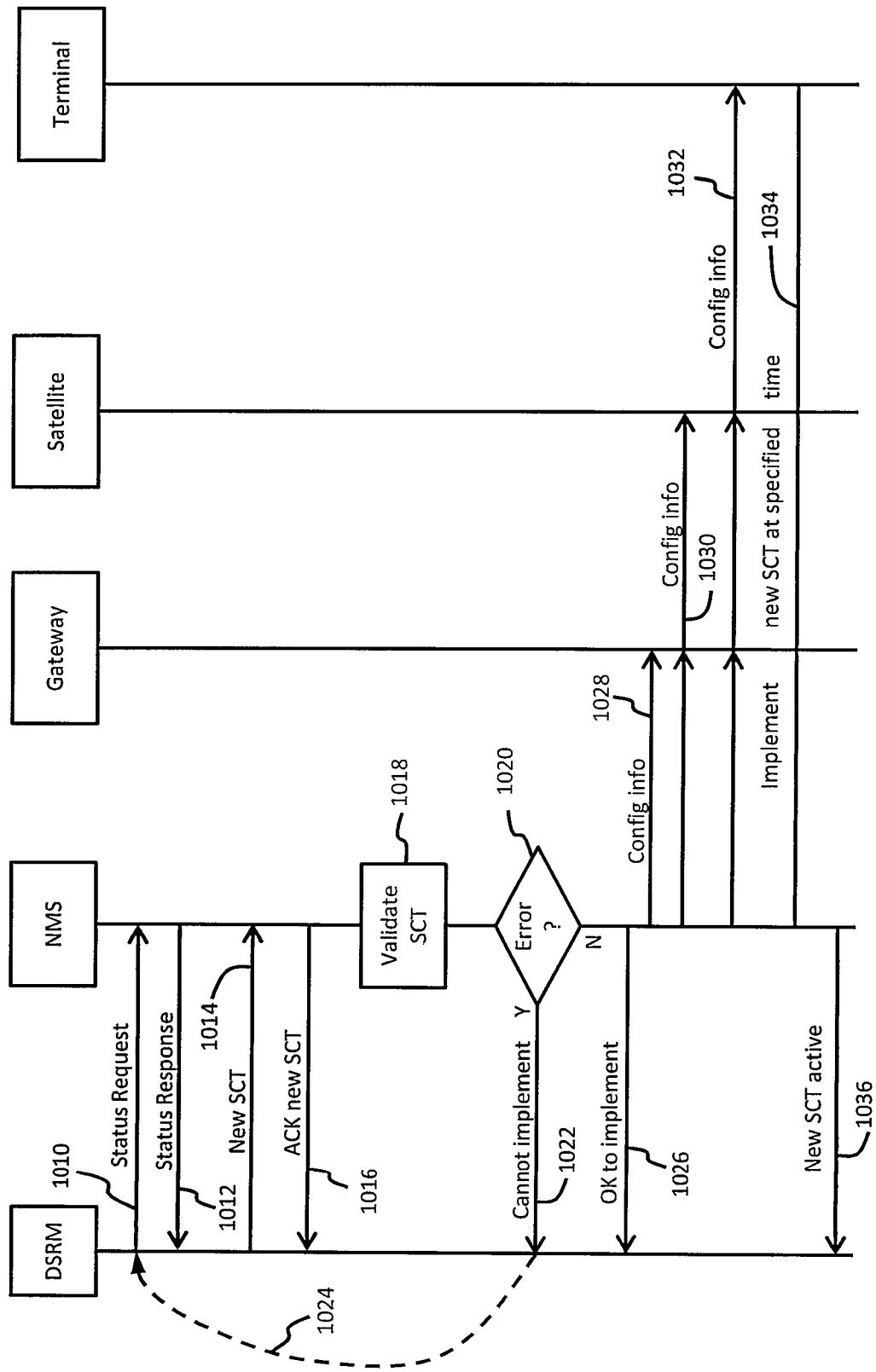
FIG. 10 is a ladder diagram illustrating interaction between various system components during implementation of a new spectrum configuration plan, according to one embodiment.

FIG. 10 is a ladder diagram illustrating interaction between various system components during implementation of a new spectrum configuration plan. At 1010, the DSRM sends a status request to the NMS. According to at least one embodiment, the status request can be a request for system information from the NMS. According to other embodiments, the status request can correspond to a request pertaining to a time when a new spectrum configuration plan can be supplied to the NMS. The status request can further correspond to a request for information pertaining to formats for submitting new spectrum configuration plans.

At 1012, the NMS provides a status response to the DSRM. Depending on the actual status request, the status response can correspond to system hardware information (e.g., status of each SNC/RFGW) or time information for receiving the next spectrum configuration plan. At 1014, the DSRM supplies the new spectrum configuration plan to the NMS. According to the illustrated embodiment, the new spectrum configuration plan is supplied as a spectrum configuration table (SCT) which includes all of the information required to configure system components for implementing the spectrum configuration plan. At 1016, the NMS acknowledges receipt of the new SCT.

At 1018, the NMS validates the SCT. As previously discussed, such validation can include, for example, syntactic checks, semantic checks, identification of differences between the current plan and the newly received plan, etc. At 1020 it is determined whether any errors have occurred as a result of the validation process. If any errors have occurred, then the NMS supplies a message to the DSRM indicating that the new spectrum configuration plan cannot be implemented at 1022. Control would then return to 1010 where the DSRM can request additional or updated status request, and supply a new spectrum configuration plan. This is indicated at 1024. If no errors have occurred, then the NMS supplies a message to the DSRM at 1026 to indicate that the spectrum configuration plan has been validated for implementation.

At 1028, the NMS supplies the configuration information to the gateway (or gateways). The gateway utilizes this information to configure all necessary components for communication using the specified parameters. At 1030, the NMS supplies configuration information to the satellite (or satellites). As can be appreciated, the NMS does not communicate directly with the satellite. Accordingly, the information is supplied to the satellite via the gateway. At 1032, the NMS supplies the configuration information to the necessary terminals. Similar to the satellite, this information is supplied to the terminals via the gateway and the satellite. More particularly, information regarding the configuration plan is provided from the NMS to the gateway. The gateway transmits the information to the satellite which relays the information to the terminals along an outroute. At 1034, the new spectrum configuration plan is implemented (or activated). At 1036, the NMS provides a message to the DSRM indicating that the new spectrum configuration plan is currently active within the satellite network.

According to various embodiments, a resource pool can be created to define inroute and outroute groupings. The resource pool can be associated with the gateway-user beam combination. A terminal locked to an outroute carrier receives inroute information from the group to which the outroute belongs. The scope of a resource pool can be, for example, per beam per RFGW. Since a beam can be served by multiple RFGWs and terminals would need to switch outroutes across RFGWs, another construct called the "resource lake" can be defined to have a scope that is at most a beam.

According to the disclosed embodiments, bandwidth grouping refers to the process of bundling one or more outroute (or forward link) CCBs and one or more inroute (or return link) CCBs into one resource pool. These CCBs are subsequently used to define outroute and inroute carriers. According to an exemplary implementation, the outroute carriers can be fixed for a specific plan, while inroute carriers can be changed with the help of a dynamic inroute reconfiguration (DIR) process implemented based on terminals link condition and/or their traffic demand. According to an embodiment, the bandwidth grouping can be performed within a beam and/or on a portion of the beam served by a particular RFGW. According to other embodiments, resources across beams are not grouped together, and resources within a beam but across RFGWs are not grouped together to form a resource pool.

According to an embodiment, only the same forward downlink polarization and cross-pol return uplink polarization can be grouped together in a BW pool shared among a group of terminals. This can be driven, in part, by the terminal capability. For a given beam, the forward and return CCBs that meet the above criteria must be present in order to achieve the highest level of granularity in the groupings. It should be noted that this can apply regardless of the presence of IP radio terminals in a network to keep the design simple although the IP Radio terminals have the capability to support different polarized outroute carriers, different polarized inroute carriers and both co-pol and cross-pol between receiver and transmitter.

According to one or more embodiments, a dedicated tenant (or subscriber) can be specified. In such embodiments, CCBs dedicated to a specific tenant can be grouped together to avoid or prevent spreading across beams and RFGWs, while also factoring polarization. For a given beam, if a forward CCB has a dedicated tenant, at least one corresponding return CCB can be provided for that tenant.

With respect to the dedicated tenant and MHz, the following different scenarios can be supported by the system.
1) A tenant can use both dedicated forward and return resources
2) Forward resource is shared among all, but a tenant receives its dedicated return resource
   a) Within a pool of forward and return, each tenant has its exclusive return resource, there is no shared return resource, nor a particular resource shared by multiple tenants
   b) Within a pool of forward and return, some return resource is shared by all tenants and other return resources are dedicated to tenants. The shared portion can be used by tenants having dedicated resource in case of resource congestion on the dedicated part occurs
   c) One or more specific resources can be dedicated to multiple tenants but not all tenants Dedicating a return resource to one or more tenants can be done, for example, by configuring different inroute set(s) to be used by those tenants. When both forward and return resources in a group are dedicated to one tenant, then a tenant specific inroute set assignment can be excluded. If the tenant is assigned to a shared forward resource with dedicated return resource, then a tenant specific inroute set assignment can be utilized. In this case, whenever an inroute MHz carveout (IMC) and inroute sets are created for this type of return CCB, the inroute set can be assigned to one particular tenant ID or multiple tenant IDs as required.

Certain properties of forward CCB and return CCB may require they be put into their own separate bandwidth pools. One such property is the forward link waveform. Table 1 and Table 2 (below), respectively illustrate properties of forward and return link CCBs as set by the DSRM. The tables can be used, in part, to define a set of rules for bandwidth pool groupings of resource pools. It should be noted that the tables only illustrate exemplary properties, and that various other properties may be considered by the DSRM when creating bandwidth and resource pools.

TABLE 1

Forward Link CCB Properties

| Forward link Properties Id | Superframe 2 Structure (Annex E enabled) | Waveform 2 (Support for better constellation and higher order MODCOD) | Waveform 1 | Comment |
|---|---|---|---|---|
| 1 | | | X | DOR creates outroutes from it with waveform 1 characteristics |
| 2 | | X | | DOR creates outroutes from it with waveform 2 characteristics, but not Annex E enabled (that is not supporting superframe format) |
| 3 | X | X | | All outroutes from this CCB Annex E enabled with waveform 1 |

As illustrated in Table 1, there are two options—do not mix waveform 1 and waveform 2 in the same BW pool or mix them in the same pool. Furthermore, with respect to the superframe format, the options are not mixing them in one pool or mixing them in one pool. According to at least one embodiment, a phased approach can be taken with respect to these criteria. Initially, the DSRM can create two different bandwidth pools for waveform 1 and waveform 2 CCBs. Within the waveform 2 CCB, the DSRM separates pools for the superframe format and non-superframe format outroutes. Regardless of the options, all the outroutes—both waveform 1 and waveform 2 can be sent to the terminals via the system information. The terminal can be configured to subsequently run a filtering algorithm to accept the proper outroutes for its operations that match a terminal's polarization and tenant.

TABLE 2

Return Link CCB Properties

| Return Link Properties Id | New Symbol Rates? | Legacy SS Inroute (TDMA 0) - saturated | Legacy SS Inroute (TDMA 0) - linear | Spreading Enabled w/ spreading factors | Description |
|---|---|---|---|---|---|
| 1 | | | X | | Modulation OQPSK and linear and spreading enabled 1x |
| 2 | | X | | | Modulation OQPSK and saturated, used by fixed terminals |
| 3 | | | X | X | As above but spreading factors beyond 1x can be specified |
| 4 | | | | X | Spreading inroutes for non-OQPSK other linear inroutes. Spreading factor is specified |
| 3 | X | | | | CCB where new symbol rates are specified, those don't support spreading |

According to an embodiment, a CCB can be specified with symbol rates that include all or some new symbol rate types which cannot be used by terminals configured to only use waveform 1. Thus, only terminals configured to use waveform 2 can use the new symbol rate types. Inroutes from these CCBs can be in a separate pool and grouped with waveform 2 forward link CCBs. To support terminals configured to use only waveform 1, the DSRM can configure CCB(s) without any new symbol rate types. Since return CCBs without new symbol rate types can be grouped with either waveform 1 forward CCBs or waveform 2 forward CCBs, the DSRM can provide specific mapping definition in the API or other configuration files. Furthermore, a return CCB intended to be grouped with a forward waveform 2 CCB can be grouped with either a superframe format waveform 2 forward CCB or non-superframe format waveform 2 forward CCB.

According to at least one embodiment, the DSRM can be configured to provide linear OQPSK legacy inroutes in order to support older terminals. The absence of specific spreading factors in the DSRM API can provide an indication to the platform to create all linear OQPSK spread 1x channels from the CCB. But if spreading factors are included, then inroute channels of linear OQPSK of different spread factors channels can be created from the CCB. The DSRM can also be configured to create saturated legacy OQPSK inroutes for older fixed terminals. Therefore, the DSRM can provide one input in the return CCB pair with forward waveform 1 or pair with waveform 2 superframe format or pair with waveform 2 non-superframe format using the following rules:

1) If a return CCB has new symbol rate types, then the input must be paired with either with waveform 2 superframe format or waveform 2 non-superframe format.
2) If a return CCB does not have new symbol rate types, then the input can be paired with any forward CCB, such as: waveform 1 forward CCB, waveform 2 superframe format forward, waveform 2 non-superframe format, etc.
3) If a return CCB contains OQPSK legacy properties, then the input must be paired with waveform 1 forward CCB.

According to at least one embodiment, when a terminal is assigned to an outroute from a group, it will be limited to use inroutes of that group. It should be noted that in a reconfigurable system, a terminal may receive outroutes transmission information of multiple such groups which are either shared or belong to its tenant. These groups can be served from multiple different RFGWs, and such construct is called a resource lake. A terminal can use outroutes along with associated inroutes across the groups. Furthermore, grouping of resource lakes follows the same rules and principles used to form resource pools. The difference between them is that a resource pool's scope is per beam per RFGW while a resource lake is on a per beam basis but can span multiple RFGWs.

Figure 11A:
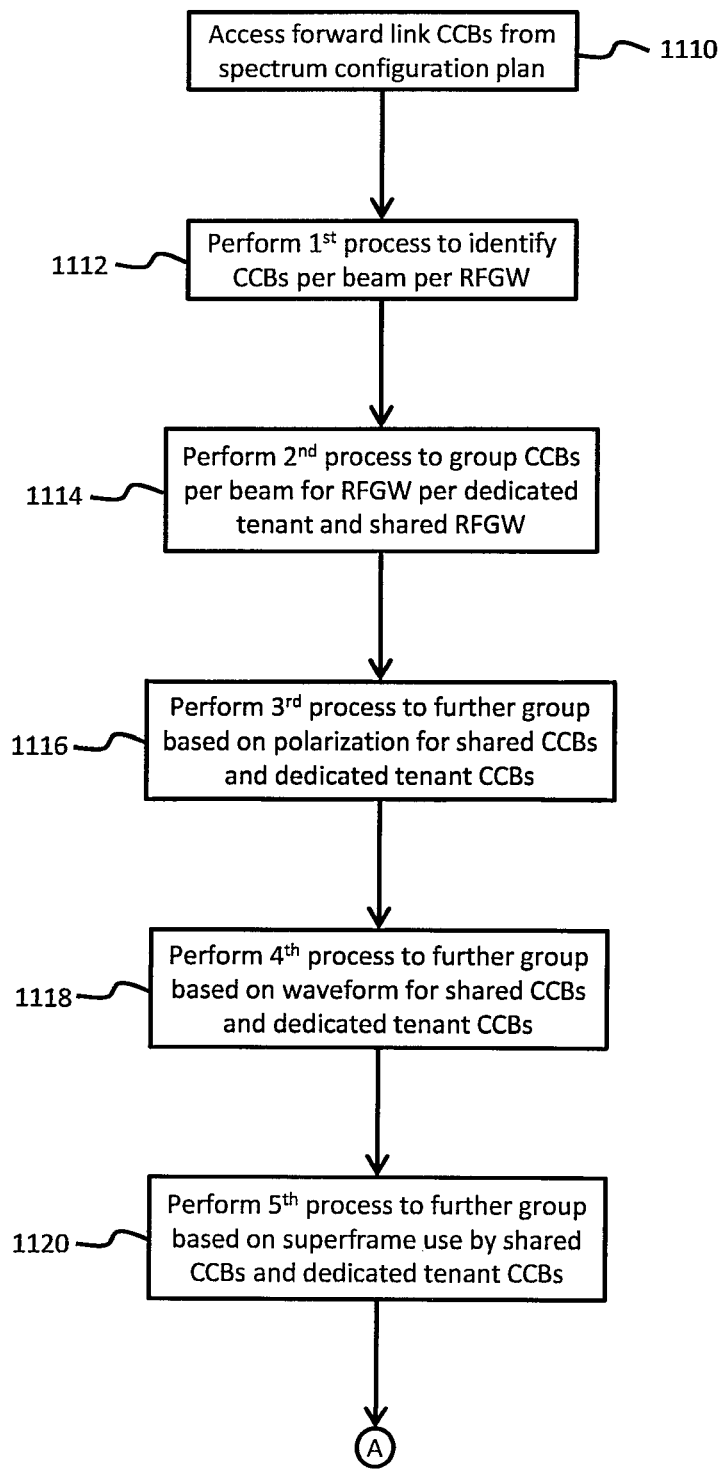
FIGS. 11A and 11B are a flowchart of a process for grouping bandwidth, according to multiple embodiments.
Figure 11B:
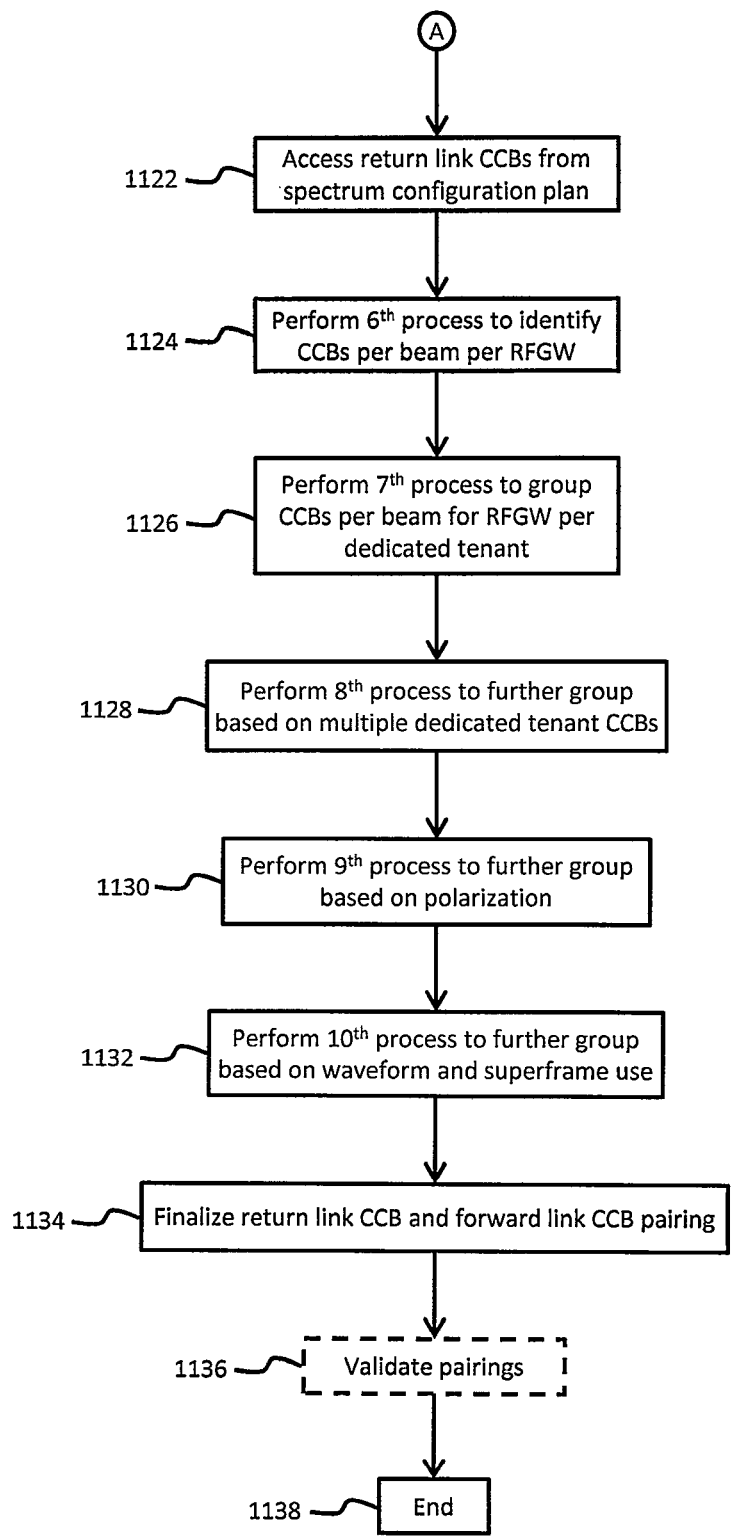

FIGS. 11A and 11B are a flowchart illustrating a process for outroute and inroute grouping according to various embodiments. The process requires, for example, creation of forward link (or outroute) groupings and creation of return link (or inroute) groupings. The forward link and return link groupings can optionally be paired together while grouping the return links. At 1110, forward link CCBs are accessed from the spectrum configuration plan. Depending on the specific implementation, this can be done while creating the spectrum configuration plan or as a modification to an existing spectrum configuration plan. At 1112, a first process is performed to identify CCBs per beam for each RFGW. According to an embodiment, this can be done by examining all the forward link CCBs in a plan and segregating them into multiple groups based on a combination of beams and RFGWs. For example, if there are two beams and two RFGWs, and each beam is served by both RFGWs, then four forward link spectrum/CCBs are created. This will subsequently result in four pairs of forward and return link spectrum/CCBs groups.

At 1114, a second process is performed to group the CCBs identified in the first process per dedicated tenants and RFGW. According to an embodiment, each of the forward CCBs grouped in the first process (at 1112) is examined to determine which ones are configured with a dedicated tenant. Each dedicated tenant can be assigned to its own group of CCBs. At least one group is maintained for all CCBs not specified with dedicated tenants. At 1116, a third process is performed to further group the CCBs based on polarization for shared CCBs and dedicated tenant CCBs. Each group obtained from 1114 (second process) is sorted into different groups based on polarization. For example, a first group can contain shared CCBs with LHCP, a second group can contain shared CCBs with RHCP, a third group can contain dedicated tenant 1 CCBs with RHCP, a fourth group can contain dedicated tenant 2 CCBs with LHCP, etc.

At 1118, a fourth process is performed to further group the CCBs based on the waveform used for shared CCBs and the waveform used for dedicated tenant CCBs. According to an embodiment, each of the groups from 1116 (third process) can be examined to determine whether or not they are using waveform 1 or waveform 2. It should be noted the use of two different waveforms is only intended to be illustrative and not restrictive. Additional waveforms can be utilized depending on the specific system implementation. According to an embodiment, if a beam requires support for both waveform 1 and waveform 2 terminals, the DSRM can be configured to define two separate CCBs. If MHz carveouts for waveform 1 and waveform 2 outroutes lead to inefficiency due to reduced multiplexing, the DSRM can create only waveform 1 outroutes to be shared by both types of terminals.

At 1120, a fifth process is performed to further group the CCBs based on the use of superframes by shared CCBs or dedicated tenant CCBs. According to an embodiment, this can include checking the CCB's property to detect the presence of superframe format waveform 2 vs. non-superframe format waveform 2, and then into different groups based on whether or not superframe format is supported. This can result, for example, in the following groups:

1) CCBs per beam per RFGW per Tenant per Pol J3 waveform w/Superframe.
2) CCBs per beam per RFGW per Tenant per Pol J3 waveform w/o Superframe.
3) CCBs per beam per RFGW shared per Pol J3 waveform w/Superframe.
4) CCBs per beam per RFGW shared per Pol J3 waveform w/o Superframe.

At 1122, return link CCBs are accessed from the spectrum configuration plan. At 1124, a sixth process is performed to identify CCBs per beam for each RFGW. This can be done, for example, by examining all the return link CCBs in a plan and segregating them into multiple groups based on a combination of beams and RFGWs. According to at least one embodiment, a check can be performed to determine if there is at least one forward group created for each combination of beam and RFGW. Such forward groups can be preliminarily paired with the return groups.

At 1126, a seventh process is performed to group the return link CCBs identified in 1124 (sixth process) per dedicated tenants. According to an embodiment, each of the return link CCBs grouped in 1124 (first process) is examined to determine which ones are configured with a dedicated tenant. Furthermore, a check can be performed to determine if there is at least one forward group for each of these tenants resulting from the sixth process. If a corresponding dedicated tenant forward link group is not found for return CCBs of a dedicated tenant, then a check can be performed to determine if at least one shared forward group is available. The preliminary pairing of return groups and forward groups from the sixth process can refined based on the grouping of dedicated tenant return link CCBs and shared return link CCBs.

At 1128, an eighth process is performed to further group the CCBs based on a presence of multiple dedicated tenants or absence of dedicated tenants. The return link CCBs are examined and segregated into two groups. At 1130, a ninth process is performed to further group the CCBs based on polarization. According to an embodiment, the grouped pairs resulting from 1126 (seventh process) and 1128 (eighth process) are examined to identify the configured polarizations of return link CCBs. They are subsequently segregated into different groups based on the different polarizations. According to one or more embodiments, each segregated group of return CCBs is paired with the opposite polarized forward group within the previously formed pair in order to further refine the preliminary pairing.

At 1132, a tenth process is performed to further group the CCBs based on waveform and superframe use. For each of the pairs from the grouping at 1130 (ninth process), the specified waveform pairing information is checked. All return link CCBs specified to pair with waveform 1 resources are paired with forward link waveform 1 groups. All return link CCBs specified to pair with waveform 2 superframe format resources are paired with forward link waveform 2 superframe format groups. According to at least one embodiment, return link CCBs utilizing waveform 2 superframe format can be paired with waveform 2 non-superframe format groups based on the specific mapping rules. The preliminary pairing is now finalized, as indicated at 1134.

According to various embodiments, various types of validations can be performed by the system with regards to the DSRM pairing input prior to activating the spectrum configuration plan. This is indicated at 1136. For example, the system may reject (or not validate) a return link CCB with new symbol rate types that is paired with a waveform 1 forward link group, or a return link CCB with legacy OQPSK that is paired with a waveform 2 forward link group. Additional validation criteria can be applied depending on system implementation and performance objectives. The process ends at 1138.

While FIGS. 11A and 11B illustrate grouping and pairing of forward links and return links, it should be noted this is done only for purposes of simplifying explanation of various features. According to various embodiments, the grouping can be performed only on the forward links, only on the return links, or on both. Furthermore, the grouped forward links can be paired with either grouped or ungrouped return links and vice versa. Additionally, pairing can be performed after grouping the return links without the need to create and update preliminary pairings.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C #, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 12:
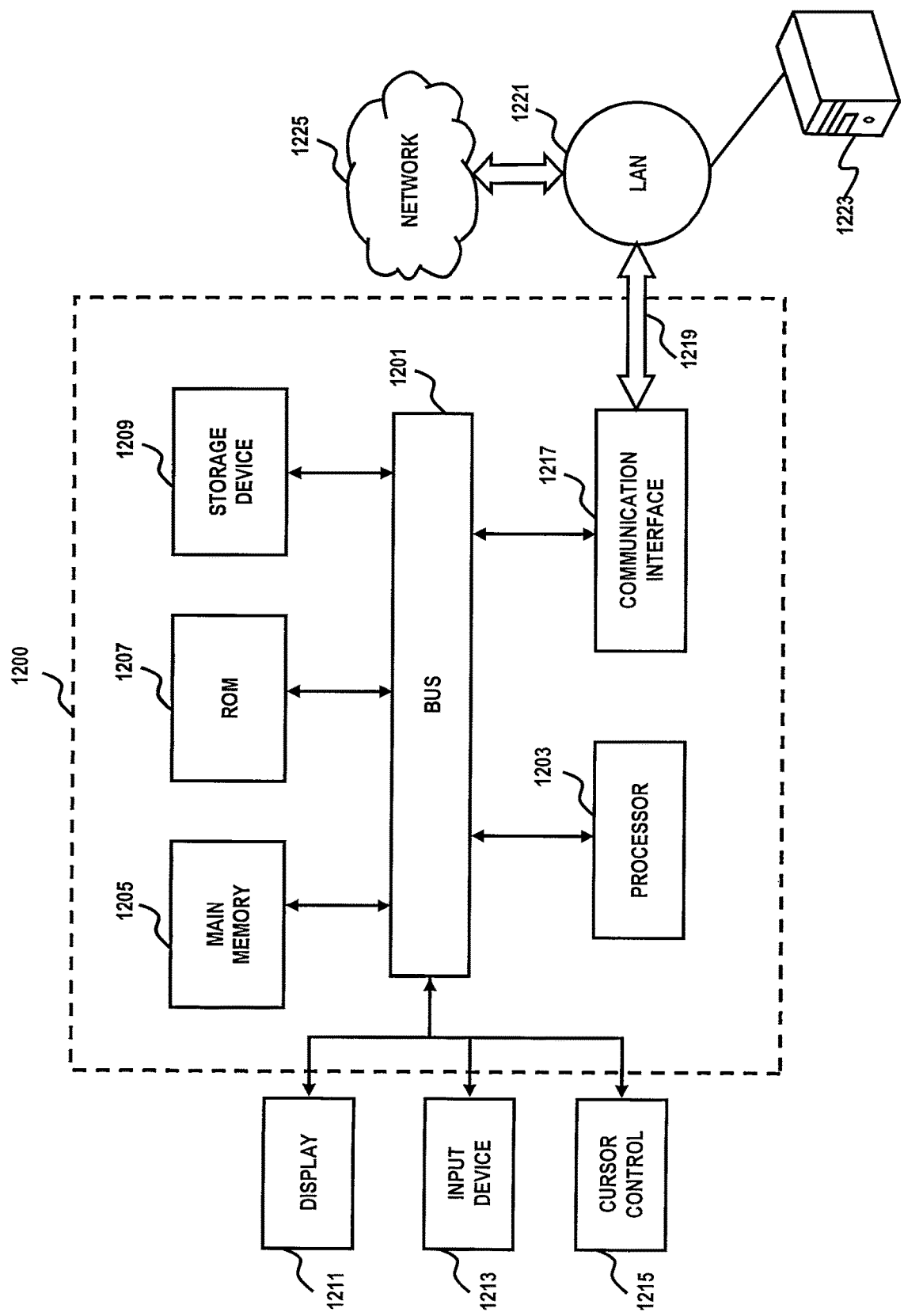
FIG. 12 is a diagram of a computer system that can be used to implement various exemplary features and embodiments.

FIG. 12 is a diagram of a computer system that can be used to implement features of various embodiments. The computer system 1200 includes a bus 1201 or other communication mechanism for communicating information and a processor 1203 coupled to the bus 1201 for processing information. The computer system 1200 also includes main memory 1205, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 1201 for storing information and instructions to be executed by the processor 1203. Main memory 1205 can also be used for storing temporary variables or other intermediate information during execution of instructions by the processor 1203. The computer system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computer system 1200 may be coupled via the bus 1201 to a display 1212, such as a light emitting diode (LED) or other flat panel displays, for displaying information to a computer user. An input device 1213, such as a keyboard including alphanumeric and other keys, is coupled to the bus 1201 for communicating information and command selections to the processor 1203. Another type of user input device is a cursor control 1215, such as a mouse, a trackball, or cursor direction keys, for communicating direction information and command selections to the processor 1203 and for controlling cursor movement on the display 1212. Additionally, the display 1212 can be touch enabled (i.e., capacitive or resistive) in order facilitate user input via touch or gestures.

According to an exemplary embodiment, the processes described herein are performed by the computer system 1200, in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement exemplary embodiments. Thus, exemplary embodiments are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 1217 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a High Definition Multimedia Interface (HDMI), etc. Although a single communication interface 1217 is depicted in FIG. 12, multiple communication interfaces can also be employed.

The network link 1219 typically provides data communication through one or more networks to other data devices. For example, the network link 1219 may provide a connection through local network 1221 to a host computer 1223, which has connectivity to a network 1225 such as a wide area network (WAN) or the Internet. The local network 1221 and the network 1225 both use electrical, electromagnetic, or optical signals to convey information and instructions. The signals through the various networks and the signals on the network link 1219 and through the communication interface 1217, which communicate digital data with the computer system 1200, are exemplary forms of carrier waves bearing the information and instructions.

The computer system 1200 can send messages and receive data, including program code, through the network(s), the network link 1219, and the communication interface 1217. In the Internet example, a server (not shown) might transmit requested code belonging to an application program for implementing an exemplary embodiment through the network 1225, the local network 1221 and the communication interface 1217. The processor 1203 may execute the transmitted code while being received and/or store the code in the storage device 1209, or other non-volatile storage for later execution. In this manner, the computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Non-volatile media can further include flash drives, USB drives, microSD cards, etc. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 13:
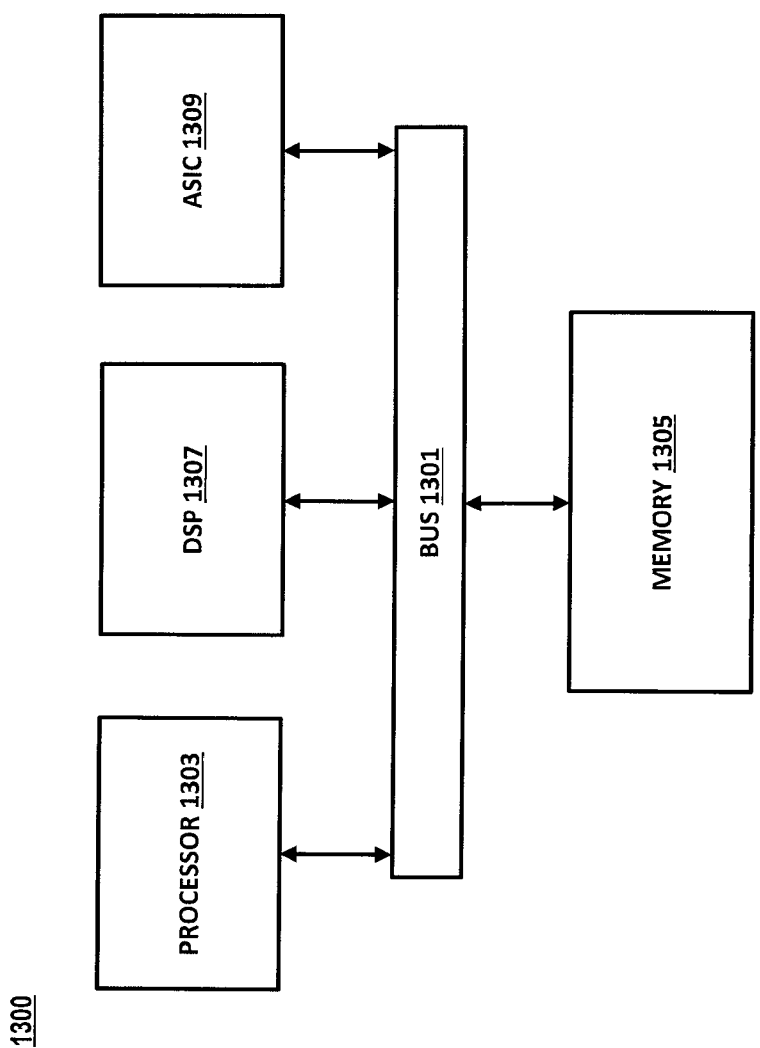
FIG. 13 is a diagram of a chip set that can be used to implement various exemplary features and embodiments.

FIG. 13 illustrates a chip set 1300 upon which features of various embodiments may be implemented. Chip set 1300 is programmed to implement various features as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1300, or a portion thereof, constitutes a means for performing one or more steps of the figures.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 1305 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
   creating a spectrum configuration plan for allocation of spectrum resources within a predetermined coverage area of a satellite communications network to facilitate future data communications of a particular customer by one or more gateways and a plurality of user terminals serviced by the one or more gateways within the predetermined coverage area, wherein the spectrum configuration plan includes information configured to reflect modifications to a prior plan which are required to facilitate the future data communications of the particular customer;
   providing the spectrum configuration plan to a network management system of the satellite communications network;
   validating the spectrum configuration plan to determine that is follows respective syntax requirements and will be compatible with other data communications operations of the satellite communications network;
   dynamically implementing the spectrum configuration plan by configuring system components of the satellite communications network to support the future data communications in accordance with the spectrum configuration plan at a predetermined point, without interruption of the other data communications operations of the satellite communications network;
   transmitting the spectrum configuration plan to the plurality of user terminals serviced by the one or more gateways.

2. The method of claim 1, wherein the spectrum configuration plan applies to a forward path, a return path, or both.

3. The method of claim 1, wherein the spectrum configuration plan comprises one or more spectrum configuration tables containing forward and return path spectrum distribution for each user beam.

4. The method of claim 1, wherein the spectrum configuration plan includes one or more of a spectrum configuration table, CCB tables, beam layout tables, frequency band tables, and carrier configuration tables.

5. The method of claim 1, wherein the validating further comprises:
   comparing the spectrum configuration plan to an existing spectrum configuration plan; and
   identifying changes to be applied as part of the spectrum configuration plan.

6. The method of claim 1, wherein transmitting the spectrum configuration plan to the plurality of user terminals comprises transmitting the spectrum configuration plan within a downlink profile containing outroute information for each terminal.

7. The method of claim 1, further comprising applying a new spectrum configuration plan transparent to terminals, if a spectrum and outroute carriers used in an active spectrum configuration plan remain the same as specified in the new spectrum configuration plan.

8. The method of claim 1, wherein the spectrum configuration plan is created by a network management system (NMS).

9. The method of claim 1, wherein:
the spectrum configuration plan is created by an external entity; and
creating the spectrum configuration plan further comprises transmitting the spectrum configuration plan to a network management system (NMS).

10. The method of claim 1, wherein the spectrum configuration plan further comprises an activation time.

11. The method of claim 1, wherein creating a spectrum configuration plan further comprises:
creating a plurality of spectrum configuration plans; and
storing the plurality of spectrum configuration plans within a spectrum plan table.

12. The method of claim 11, wherein the spectrum plan table includes an activation time for activating each spectrum configuration plan stored therein.

13. The method of claim 11, further comprising:
receiving an index corresponding to a selected spectrum configuration plan stored in the spectrum plan table; and
receiving an activation time for activating the spectrum configuration plan corresponding to the received index.

14. The method of claim 1, wherein each spectrum configuration plan applies to one or more contiguous chunks of bandwidth (CCB).

15. The method of claim 14, wherein one inroute carrier or one outroute carrier is used per CCB.

16. The method of claim 1, further comprising:
creating at least one anchor outroute for each beam; and
storing information related to the at least one anchor outroute in each of the plurality of user terminals.

17. The method of claim 16, wherein one or more newly activated user terminals of the plurality of user terminals receive active or new spectrum configuration plans from the at least one anchor outroute.

18. The method of claim 1, wherein creating a spectrum configuration plan further comprises grouping forward link bandwidth, return link bandwidth, or both.

19. The method of claim 18, wherein the grouping is performed based on one or more of system capabilities, terminal capabilities, available RFGWs, CCB characteristics, subscriber type, polarization, waveform type, and superframe use.

20. The method of claim 18, further comprising pairing grouped forward link bandwidth and ungrouped return link bandwidth, or ungrouped forward link bandwidth with grouped return link bandwidth.

21. The method of claim 18, further comprising pairing grouped forward link bandwidth with grouped return link bandwidth.

* * * * *